United States Patent
Mosek et al.

(10) Patent No.: US 8,028,122 B2
(45) Date of Patent: Sep. 27, 2011

(54) METHODS AND SYSTEMS FOR CLASSIFYING STORAGE SYSTEMS USING FIXED STATIC-IP ADDRESSES

(75) Inventors: Amir Mosek, Tel Aviv (IL); Itzhak Pomerantz, Kfar Saba (IL)

(73) Assignee: SanDisk IL Ltd., Kfar Saba (IL)

( * ) Notice: Subject to any disclaimer, the term of this patent is extended or adjusted under 35 U.S.C. 154(b) by 432 days.

(21) Appl. No.: 11/969,928

(22) Filed: Jan. 7, 2008

(65) Prior Publication Data

US 2009/0177848 A1    Jul. 9, 2009

(51) Int. Cl.
*G06F 12/00* (2006.01)
(52) U.S. Cl. ........................................ 711/103; 711/154
(58) Field of Classification Search .................. 711/103, 711/154

See application file for complete search history.

(56) References Cited

U.S. PATENT DOCUMENTS

| | | | |
|---|---|---|---|
| 7,023,878 B2 | 4/2006 | Ho | |
| 7,353,073 B2 * | 4/2008 | Ferchau | 700/108 |
| 7,688,814 B2 * | 3/2010 | Frank et al. | 370/380 |
| 2002/0049825 A1 | 4/2002 | Jewett et al. | |
| 2003/0115447 A1 | 6/2003 | Pham et al. | |
| 2003/0223281 A1 * | 12/2003 | Roohparvar | 365/200 |
| 2004/0030770 A1 | 2/2004 | Pandya | |
| 2004/0215688 A1 | 10/2004 | Frank et al. | |
| 2004/0221050 A1 | 11/2004 | Smith | |
| 2005/0204071 A1 | 9/2005 | Vance | |
| 2005/0251684 A1 * | 11/2005 | Mitsuoka et al. | 713/182 |
| 2006/0026257 A1 | 2/2006 | Frank et al. | |
| 2006/0187925 A1 | 8/2006 | Brune et al. | |
| 2006/0206662 A1 * | 9/2006 | Ludwig et al. | 711/114 |
| 2007/0239857 A1 | 10/2007 | Mahalal et al. | |
| 2007/0255783 A1 | 11/2007 | Kamvysselis | |
| 2008/0189474 A1 * | 8/2008 | Kim et al. | 711/103 |
| 2008/0228998 A1 * | 9/2008 | Colecchia et al. | 711/103 |
| 2010/0049906 A1 * | 2/2010 | Tao | 711/103 |

* cited by examiner

*Primary Examiner* — Hashem Farrokh
(74) *Attorney, Agent, or Firm* — Martine Penilla & Gencarella, LLP

(57) ABSTRACT

A storage system for exchanging data with a host system, the storage system including a plurality of storage devices, each of the storage devices including: a non-volatile memory, wherein a fixed static-IP address resides in the non-volatile memory, the fixed static-IP address being common to two or more of the plurality of storage devices, and the fixed static-IP address providing enablement of a storage-device functionality of the storage device; a physical interface for operationally connecting the storage device with the host system; and a memory controller for: controlling the respective non-volatile memory; and exchanging data, using a communication protocol, via the respective fixed static-IP address. For at least one of the storage devices, the respective fixed static-IP address may be pre-loaded into the respective non-volatile memory during manufacture, or installed in the respective non-volatile memory after manufacture.

16 Claims, 2 Drawing Sheets

METHODS AND SYSTEMS FOR CLASSIFYING STORAGE SYSTEMS USING FIXED STATIC-IP ADDRESSES

FIELD AND BACKGROUND OF THE INVENTION

Example embodiments described herein relate to methods and systems for classifying storage devices using fixed static-IP addresses.

With the establishment of the Internet and web browsing as a central source of activity in the computing world, the use of transmission control protocol/internet protocol (better known simply as TCP/IP), the communication language of the Internet, has become prevalent in computing development for various device-communication applications as well. TCP/IP enables features that currently are not supported by logical block addressing (LBA) architecture.

However, TCP/IP (and other communication protocols based on OSI layers) is mostly suited to communication between applications executed from different systems (e.g. different operating system and hardware) to communicate with each other in a standard way. Furthermore, extensive modifications to LBA architecture and associated applications are necessary in order to employ LBA as a standard in security and communication applications between client and server applications, for example.

Storage devices that utilize LBA architecture (e.g. file system and block device driver) provide a standard command for retrieving information from the storage device (e.g. vendor ID/name). Such a configuration only partially solves the problem of obtaining the properties (e.g. security and compression properties) of the storage device, since the storage device is limited to export only standard capabilities, not proprietary ones. Implementation of TCP/IP in storage-device architectures has not been utilized in the art for such data-access applications.

It would be desirable to have methods and systems for enabling a standard web-server storage environment for local devices (e.g. flash-memory devices and SIM cards).

SUMMARY OF THE INVENTION

The example embodiments described provide methods and systems for classifying storage devices using fixed static-IP addresses, which can enable a standard web-server storage environment for local devices.

For the purpose of clarity, several terms which follow are specifically defined for use herein. The term "fixed static-IP address" is used herein to refer to a static-IP address that, once assigned, persists indefinitely (though not necessarily permanently) over time in a resident storage memory. The term "classifying" is used herein to refer to a scheme by which a request from a host system is handled in a manner that depends on which fixed static-IP address of the storage device the request uses. The term "partition static-IP address" is used herein to refer to a static-IP address that provides access to a logical memory partition.

The expression "providing enablement of a storage-device functionality" is used herein to refer to activating a storage-device functionality which may or may not require a respective fixed static-IP address to perform the activation. Thus, for example, a write command may be performed as a storage-device functionality with or without a respective fixed static-IP address; however, a write command accompanied by the respective fixed static-IP address may perform an enhanced write operation (e.g. compression, encryption, and/or remote back-up before writing to the storage device), or an alternate operation (e.g. compression, encryption, and/or remote back-up without writing to the storage device).

Thus, use of the fixed static-IP address effectively causes the storage device to handle the request (e.g. write command) from the host system in a specific manner. Furthermore, different fixed static-IP addresses may be employed, each of which effectively causes the host system's requests to be handled in a different manner. In this sense, storage devices may effectively be "classified" (e.g. by a host system). A fuller discussion of this subject matter is given below with reference to FIG. 2.

Example embodiments described herein enable a storage device (e.g. an MP3 player) to communicate with a host system that is not always connected to a network. When the host system is not connected to the network, the storage device and the host system cannot connect to a DNS server to obtain an IP address. Example embodiments described herein employ a fixed static-IP address to enable such communication.

Example embodiments described herein also enable an application launched from a host system to communicate over TCP/IP with the local storage device by obtaining the fixed static-IP address of the local storage device. In systems that employ LBA architecture, such communication is enabled, e.g. via the LEA-supported command—GetDiskInfo. By using the fixed static-IP address over a TCP/IP communication framework, as described herein, (or a functional equivalent thereof), enhanced functionality is available that surpasses LBA capabilities.

Such a TCP/IP functional equivalent scheme using a slim IP stack is disclosed by Mosek, in a U.S. patent application entitled "Methods and Systems for Communicating with Storage Devices using Slim IP Stacks", filed on the same day as the instant application, and assigned to the assignee of the instant application.

Therefore, according to example embodiments described herein, there is provided for the first time a storage system for exchanging data with a host system, the storage system including a plurality of storage devices, each of the storage devices including: (a) a non-volatile memory, wherein a fixed static-IP address resides in the non-volatile memory, the fixed static-IP address being common to two or more of the plurality of storage devices, and the fixed static-IP address providing enablement of a storage-device functionality of the storage device; (b) a physical interface for operationally connecting the storage device with the host system; and (c) a memory controller for: (i) controlling the respective non-volatile memory; and (ii) exchanging data, using a communication protocol, via the respective fixed static-IP address.

For at least one of the storage devices, the respective non-volatile memory may have at least one memory partition accessible only by a partition static-IP address.

For at least one of the storage devices, the respective physical interface may be an interface selected from the group consisting of: a USB connector, an MMC connector, an SD connector, and a hard-wired on-board connection.

For at least one of the storage devices, the respective fixed static-IP address may be pre-loaded into the respective non-volatile memory during manufacture, or installed in the respective non-volatile memory after manufacture.

For each of the storage devices, the respective storage-device functionality may include a functionality selected from the group consisting of: accessing a partition, enabling a security feature, providing a search capability, activating a pre-loaded content preview to provide access to a complete associated content file, saving end-user statistics, enabling an enhancement feature, and performing a storage operation.

For each of the storage devices, the respective communication protocol may be a TCP/IP protocol or functional equivalent thereof.

For at least one of the storage devices, the respective memory controller may handle a request from the host system in a manner that depends on which fixed static-IP address of the storage device the request uses.

According to example embodiments described herein, there is provided for the first time a method for configuring a plurality of storage devices for exchanging data with a host system, the method including the steps of: (a) providing a non-volatile memory in each of a plurality of storage devices, wherein a fixed static-IP address resides in the non-volatile memory, the fixed static-IP address being common to two or more of the plurality of storage devices, and the fixed static-IP address providing enablement of a storage-device functionality of the storage device; and (b) providing a respective memory controller for exchanging data, using a communication protocol, via the respective fixed static-IP address and a respective physical interface.

For at least one of the storage devices, the respective non-volatile memory may have at least one memory partition accessible only by a partition static-IP address.

For at least one of the storage devices, the respective physical interface may be an interface selected from the group consisting of: a USB connector, an MMC connector, an SD connector, and a hard-wired on-board connection.

For at least one of the storage devices, the respective fixed static-IP address may be pre-loaded into the respective non-volatile memory during manufacture, or installed in the respective non-volatile memory after manufacture.

For each of the storage devices, the respective storage-device functionality may include a functionality selected from the group consisting of: accessing a partition, enabling a security feature, providing a search capability, activating a pre-loaded content preview to provide access to a complete associated content file, saving end-user statistics, enabling an enhancement feature, and performing a storage operation.

For each of the storage devices, the respective communication protocol may be a TCP/IP protocol or functional equivalent thereof.

For at least one of the storage devices, the respective memory controller may handle a request from the host system in a manner that depends on which fixed static-IP address of the storage device the request uses.

These and further embodiments will be apparent from the detailed description and examples that follow.

BRIEF DESCRIPTION OF THE DRAWINGS

Example embodiments are herein described, by way of example only, with reference to the accompanying drawings, wherein.

DESCRIPTION OF THE PREFERRED EMBODIMENTS

Example embodiments described herein relate to methods and systems for classifying storage devices using fixed static-IP addresses. The principles and operation for classifying storage devices using fixed static-IP addresses, according to example embodiments described herein, may be better understood with reference to the accompanying description and the drawings.

Figure 1B:
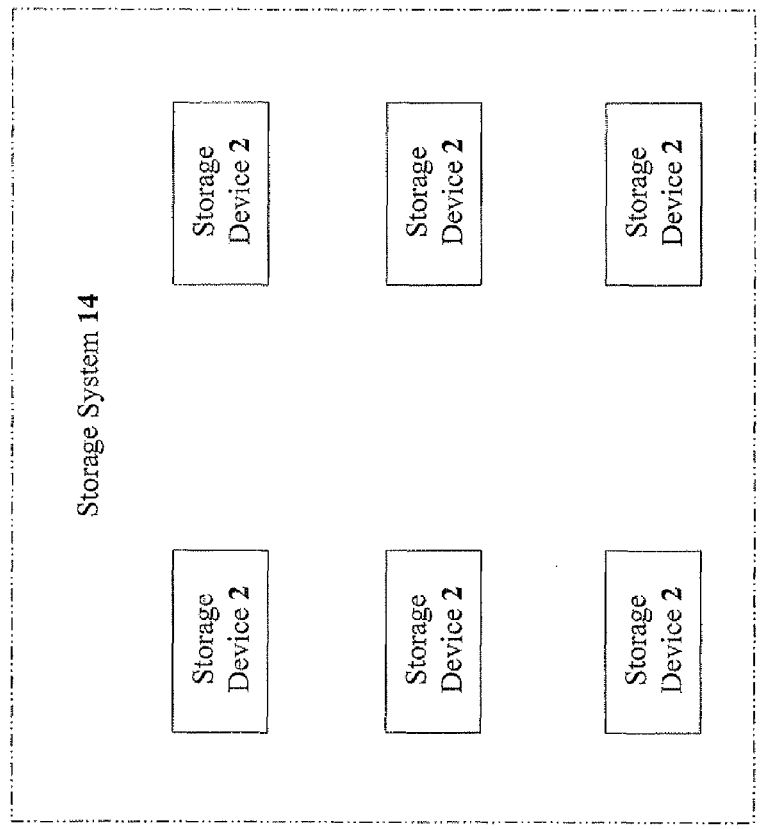
FIG. 1B is a simplified schematic block diagram of a storage system including a plurality of the storage devices of FIG. 1A, according to example embodiments described herein.
Figure 1A:
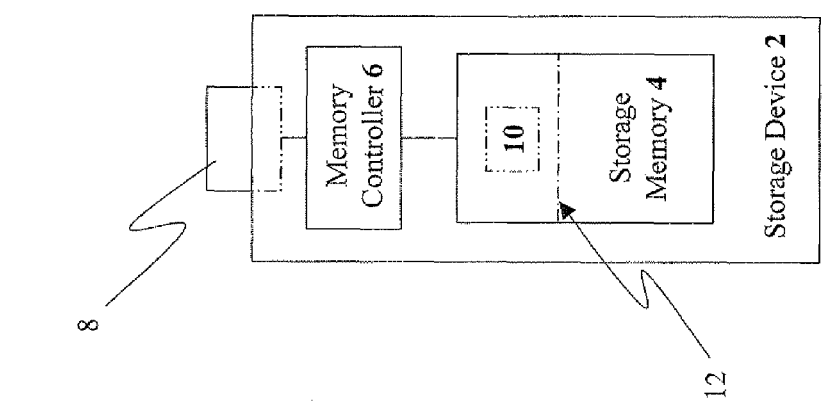
FIG. 1A is a simplified schematic block diagram of a storage device, according to example embodiments described herein.

Referring now to the drawings, FIG. 1A is a simplified schematic block diagram of a storage device, according to example embodiments described herein. A storage device 2 is shown having a storage memory 4 (e.g. but not necessarily a non-volatile memory), a memory controller 6, and a connector 8 (i.e. physical interface) (e.g. SD, MMC, USB, SIM, or Bluetooth format). It is noted that in configurations in which storage device 2 is embedded in another device, connector 8 may be a hard-wired on-board connection. A static-IP address 10 (e.g. in the format x.x.x.x) is stored in storage memory 4. Optionally, static-IP address 10 may reside within an area defined by a partition 12 of storage memory 4. Implementation of optional partition 12 can be configured in a memory-management area that is not accessible by a host system.

Although only one static-IP address 10 is shown in FIG. 1A, more than one static-IP address 10 may be stored in storage memory 4. As discussed above, a fixed static-IP address may be used to "classify" a storage device from the point of view of a host system. It may be useful to employ different fixed static-IP addresses for one or more storage devices for such "classification" purposes. While the description below refers generally to the case of a single static-IP address for the sake of convenience, it is understood that the description is applicable to the case of multiple static-IP addresses as well.

Static-IP address 10 may be a fixed static-IP address common to two or more of a plurality of storage devices, or may be a partition static-IP address (i.e. designating access to an area within a particular partition on a storage device). Static-IP address 10 may be pre-loaded into storage memory 4 upon manufacture of storage device 2, or may be installed into storage memory 4 after manufacture of storage device 2. Static-IP address 10 can be configured to enable activation of any one or more of various storage-device functionalities (e.g. accessing a partition, enabling a security feature, providing a search capability, activating a pre-loaded content preview to display full content, saving end-user statistics, enabling an enhancement feature, performing a storage operation, or other functionalities). It is understood that a person having ordinary skill in the art would know how to so configure a static-IP address 10. In implementations in which multiple, different static-IP addresses 10 are used, the static-IP addresses can be configured to enable different storage-device functionalities.

FIG. 1B is a simplified schematic block diagram of a storage system including a plurality of the storage devices of FIG. 1A, according to example embodiments described herein. A storage system 14, as shown in FIG. 1B, is not limited to the number of storage devices 2, but may include any number of storage devices 2. For the sake of simplicity, FIG. 1A shows, and the description herein describes, the details of only one of the plurality of storage devices 2; however, it is understood that such a configuration applies to each storage device 2 shown in FIG. 1B.

Figure 2:
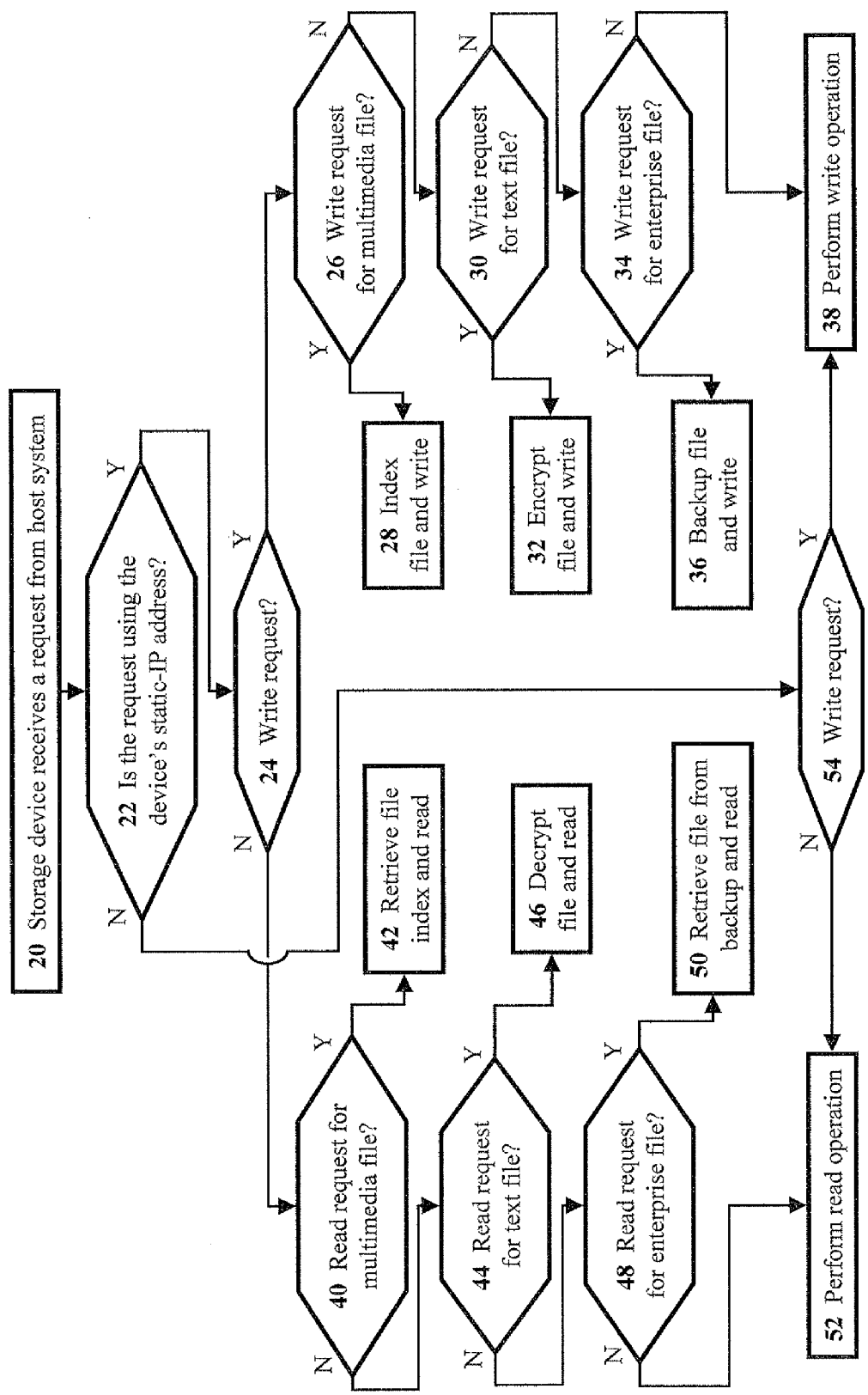
FIG. 2 is a simplified flowchart of the major process steps in handling a storage-device request that uses a fixed static-IP address, according to example embodiments described herein.

FIG. 2 is a simplified flowchart of the major process steps in handling a storage-device request that uses a fixed static-IP address, according to example embodiments described herein. The process starts when storage device 2 receives a request from a host system (Step 20). Memory controller 6 of storage device 2 determines whether the request is using static-IP address 10 of storage device 2 (Step 22). If the request is using static-IP address 10, then memory controller 6 determines whether the request is a write request (Step 24).

If the request is a write request, then memory controller 6 determines whether the request is to write a multimedia file (Step 26). If so, then memory controller 6 indexes the file (e.g. according to artist/album/year), and writes the file to storage memory 4 (Step 28). If the request is not for a multimedia file, memory controller 6 then determines whether the request is to write a text file (Step 30). If so, then memory controller 6 may encrypt the file, for example, according to preference settings, and then write the file to storage memory 4 (Step 32).

If the request is not for a text file, memory controller 6 then determines whether the request is to write an "enterprise" file (Step 34). An enterprise file can be any kind of data file (e.g. multimedia or text) that requires special handling due to the file being a file of a given organization. If the request is for an enterprise file, then memory controller 6 may backup the file, for example, to a remote server, and then write the file to storage memory 4 (Step 36). If the request is not for an enterprise file, then memory controller 6 simply performs the write operation (Step 38).

If the request is using static-IP address 10, but is not a write request (Step 24), then memory controller 6 determines whether the request is to read a multimedia file (Step 40). If so, then memory controller 6 retrieves the file index, and reads the file from storage memory 4 (Step 42). If the request is not for a multimedia file, memory controller 6 then determines whether the request is to read a text file (Step 44). If so, then memory controller 6 may decrypt the file, for example, and then read the file from storage memory 4 (Step 46).

If the request is not for a text file, memory controller 6 then determines whether the request is to read an enterprise file (Step 48). If so, then memory controller 6 may retrieve the file from backup, for example, and then read the file (Step 50). If the request is not for an enterprise file, then memory controller 6 simply performs the read operation (Step 52).

If the request is not using static-IP address 10 (Step 22), memory controller 6 determines whether the request is a write request (Step 54). If so, then memory controller 6 performs the write operation (Step 38). If the request is not a write request, then memory controller 6 performs the read operation (Step 52).

As discussed, different fixed static-IP addresses 10 may be employed by different storage devices or by a single storage device at different times, resulting in respective different handling of requests received from a host system.

As seen from the above description, storage devices may effectively be classified by a host system based on the fixed static-IP address. The storage device may be configured to interpret a request from the host system in a manner that depends on which IP address of the storage device the request uses. Use of a fixed static-IP address is not necessarily limited to storage-device requests to write or read data.

While the invention has been described with respect to a limited number of example embodiments, it will be appreciated that many variations, modifications, and other applications of the invention may be made.

What is claimed is:

1. A storage system for exchanging data with a host system, the storage system including a plurality of storage devices, each of the storage devices comprising:
    (a) a non-volatile memory, wherein a fixed static-IP address resides in said non-volatile memory, said fixed static-IP address being common to two or more of said plurality of storage devices, and said fixed static-IP address providing enablement of a storage-device functionality of the storage device;
    (b) a physical interface for operationally connecting the storage device with a host system; and
    (c) a memory controller for;
        (i) controlling said non-volatile memory;
        (ii) determining whether a request received from the host system uses the fixed static-IP address; and
        (iii) fulfilling the request without activating the storage-device functionality when the request does not use the fixed static-IP address; and
        (iv) fulfilling the request by activating the storage-device functionality when the request uses the fixed static-IP address, and exchanging data, using a communication protocol, via said fixed static-IP address.

2. The storage system of claim 1, wherein, for at least one of the storage devices, said non-volatile memory has at least one memory partition accessible only by a partition static-IP address.

3. The storage system of claim 1, wherein, for at least one of the storage devices, said physical interface is an interface selected from the group consisting of: a USB connector, an MMC connector, an SD connector, and a hard-wired on-board connection.

4. The storage system of claim 1, wherein, for at least one of the storage devices, said fixed static-IP address is pre-loaded into said non-volatile memory during manufacture.

5. The storage system of claim 1, wherein, for at least one of the storage devices, said fixed static-IP address is installed in said non-volatile memory after manufacture.

6. The storage system of claim 1, wherein, for each of the storage devices, said storage-device functionality includes a functionality selected from the group consisting of: accessing a partition, enabling a security feature, providing a search capability, activating a pre-loaded content preview to provide access to a complete associated content file, saving end-user statistics, enabling an enhancement feature, and performing a storage operation.

7. The storage system of claim 1, wherein, for each of the storage devices, said communication protocol is a TCP/IP protocol or functional equivalent thereof.

8. The storage system of claim 1, wherein, for at least one of the storage devices, said memory controller handles a request from the host system in a manner that depends on which fixed static-IP address of the storage device said request uses.

9. A method for configuring a plurality of storage devices for exchanging data with a host system, the method comprising the steps of:
    (a) providing a non-volatile memory in each of a plurality of storage devices, wherein a fixed static-IP address resides in said non-volatile memory, said fixed static-IP address being common to two or more of the plurality of storage devices, and said fixed static-IP address providing enablement of a storage-device functionality of the storage device; and
    (b) providing a respective memory controller for determining whether a request received from the host system uses the fixed static-IP address, fulfilling the request without activating the storage-device functionality when the request does not use the fixed static-IP address, and fulfilling the request by activating the storage-device functionality when the request uses the fixed static-IP address, and exchanging data, using a communication protocol, via said fixed static-IP address and a respective physical interface.

10. The method of claim 9, wherein, for at least one of the storage devices, said non-volatile memory has at least one memory partition accessible only by a partition static-IP address.

11. The method of claim 9, wherein, for at least one of the storage devices, said respective physical interface is an interface selected from the group consisting of: a USB connector, an MMC connector, an SD connector, and a hard-wired on-board connection.

12. The method of claim 9, wherein, for at least one of the storage devices, said respective fixed static-IP address is pre-loaded into said non-volatile memory during manufacture.

13. The method of claim 9, wherein, for at least one of the storage devices, said respective fixed static-IP address is installed in said non-volatile memory after manufacture.

14. The method of claim 9, wherein, for each of the storage devices, said storage-device functionality includes a functionality selected from the group consisting of: accessing a partition, enabling a security feature, providing a search capability, activating a pre-loaded content preview to provide access to a complete associated content file, saving end-user statistics, enabling an enhancement feature, and performing a storage operation.

15. The method of claim 9, wherein, for each of the storage devices, said communication protocol is a TCP/IP protocol or functional equivalent thereof.

16. The method of claim 9, wherein, for at least one of the storage devices, said respective memory controller handles a request from the host system in a manner that depends on which fixed static-IP address of the storage device said request uses.

* * * * *